United States Patent
Yang et al.

(10) Patent No.: US 10,435,821 B2
(45) Date of Patent: Oct. 8, 2019

(54) CARBON FIBER COMPOSITIONS AND METHODS OF MAKING

(71) Applicants: THE BOARD OF REGENTS OF THE UNIVERSITY OF TEXAS SYSTEM, Austin, TX (US); KOREA INSTITUTE OF CARBON CONVERGENCE TECHNOLOGY, Jeonbuk (KR)

(72) Inventors: Duck J. Yang, Flower Mound, TX (US); Benjamin Batchelor, Dallas, TX (US); Samsuddin Faisal Mahmood, Dallas, TX (US); Dennis W. Smith, Dallas, TX (US); Wenjin Deng, St. Louis, MO (US); Hyunkyu Shin, Jeonbuk (KR); Minhye Jung, Jeonbuk (KR)

(73) Assignees: BOARD OF REGENTS, THE UNIVERSITY OF TEXAS SYSTEM, Austin, TX (US); KOREA INSTITUTE OF CARBON CONVERGENCE TECHNOLOGY, Jeonbuk (KR)

( * ) Notice: Subject to any disclaimer, the term of this patent is extended or adjusted under 35 U.S.C. 154(b) by 59 days.

(21) Appl. No.: 15/118,292

(22) PCT Filed: Feb. 14, 2015

(86) PCT No.: PCT/US2015/015980
§ 371 (c)(1),
(2) Date: Aug. 11, 2016

(87) PCT Pub. No.: WO2015/175050
PCT Pub. Date: Nov. 19, 2015

(65) Prior Publication Data
US 2017/0167055 A1    Jun. 15, 2017

Related U.S. Application Data

(60) Provisional application No. 61/940,223, filed on Feb. 14, 2014.

(51) Int. Cl.
*D01F 9/22* (2006.01)
*D01F 6/38* (2006.01)
(Continued)

(52) U.S. Cl.
CPC .............. *D01F 9/225* (2013.01); *B29C 48/05* (2019.02); *B29C 48/79* (2019.02); *B29C 48/91* (2019.02);
(Continued)

(58) Field of Classification Search
None
See application file for complete search history.

(56) References Cited

U.S. PATENT DOCUMENTS

| | | | | |
|---|---|---|---|---|
| 2,603,621 A | * | 7/1952 | Craig | C08L 33/20 |
| | | | | 525/204 |
| 5,168,004 A | * | 12/1992 | Daumit | D01D 5/08 |
| | | | | 423/447.1 |

(Continued)

OTHER PUBLICATIONS

Burchell, etc., Carbon Materials for Advanced Technologies 1999, Pergamon, pp. 119-123, 128. (Year: 1999).*

(Continued)

*Primary Examiner* — Monica A Huson
*Assistant Examiner* — Kelsey C Grace
(74) *Attorney, Agent, or Firm* — Parker Highlander PLLC

(57) ABSTRACT

The invention is directed to melt-processable carbon fiber precursors which have the capability of thermal stabilization in air followed by carbonization in inert atmosphere which make them cost effective and widen their applications.

14 Claims, 4 Drawing Sheets

(51) Int. Cl.
    *C08F 220/48* (2006.01)
    *D01D 1/02* (2006.01)
    *D01D 5/084* (2006.01)
    *D01D 10/02* (2006.01)
    *C01B 32/05* (2017.01)
    *B29C 48/92* (2019.01)
    *B29C 48/05* (2019.01)
    *B29C 48/79* (2019.01)
    *B29C 48/91* (2019.01)

(52) U.S. Cl.
    CPC .............. *B29C 48/92* (2019.02); *C01B 32/05* (2017.08); *C08F 220/48* (2013.01); *D01D 1/02* (2013.01); *D01D 5/084* (2013.01); *D01D 10/02* (2013.01); *D01F 6/38* (2013.01); *B29C 2948/92209* (2019.02); *B29C 2948/92704* (2019.02)

(56) References Cited

U.S. PATENT DOCUMENTS

| | | |
|---|---|---|
| 5,286,563 A | 2/1994 | Takahashi |
| 2008/0287607 A1 | 11/2008 | Chen et al. |
| 2012/0027944 A1 | 2/2012 | Yu et al. |
| 2012/0288434 A1 | 11/2012 | Yang et al. |
| 2013/0133819 A1 | 5/2013 | Choi et al. |
| 2013/0337033 A1 | 12/2013 | Balkus, Jr. et al. |

OTHER PUBLICATIONS

International Search Report and Written Opinion issued in International Application No. PCT/US2015/015980, dated Nov. 6, 2015.
International Preliminary Report on Patentability issued in International Application No. PCT/US2015/015980, dated Aug. 25, 2016.

* cited by examiner

CARBON FIBER COMPOSITIONS AND METHODS OF MAKING

This application is a national phase application under 35 U.S.C. § 371 of International Application No. PCT/US2015/015980, filed Feb. 14, 2015, which claims priority to U.S. Application No. 61/940,223, filed Feb. 14, 2014. The entire text of each of the above referenced disclosures is specifically incorporated herein by reference.

FIELD OF THE INVENTION

The invention is directed to melt-processable carbon fiber precursors which have the capability of thermal stabilization in air which make them cost effective and widen their applications.

BACKGROUND OF THE INVENTION

Carbon fiber polymer composites have attracted worldwide interest in sporting goods and aerospace industries due to their excellent specific strength, stiffness and lightweight. Thus the synthesis, structural characterization, and cyclization studies of polyacrylonitrile (PAN) based precursors have received a great deal of attention in recent years. PAN-based carbon fibers are usually produced by the following steps: 1) spinning of precursors; 2) oxidative stabilization and carbonization of fiber precursors. Solution spinning of the precursors is carried out at different drawing rates while stabilization typically occurs around 200-300° C. in air, which leads to the formation of a ladder polymer necessary to obtain a high quality carbon fiber. The step of forming ladder polymers is very important, as it influences the physical properties and the microstructure of the resultant carbon fibers. Subsequently, carbonization is carried out at temperature of 1000-1400° C. in an inert atmosphere which removes nearly all of the non-carbon elements. The resulting carbon fibers are used to produce the reinforced polymer composites which are known to give high strength, high modulus, light weight and high heat resistance.

PAN-based carbon fiber precursors are preferred reinforcement for structural composites in various aerospace and military applications and have attracted worldwide interest in their use for sporting goods to aerospace industry due to their excellent specific strength and stiffness combined with their lightweight. The traditional carbon fiber precursors degrade before they melt therefore, the precursor fibers are generally solution-spun (20-30 wt % solution) in polar solvents. The solution spinning involves the disadvantages of solvent toxicity, solvent recovery and higher processing cost which restrict their use to limited number of applications necessitating to prepare the cost effective carbon fibers to expand their applications in other sectors like sports and automobile industries. Melt processable carbon fiber precursors based upon the terpolymer of acrylonitrile, methyl acrylate and acryloyl benzophenone (ABP) are known, which require UV stabilization which again leads to higher cost.

There is therefore a need to develop melt processable carbon fiber precursors at a lower cost. The claimed invention provides a method for forming a carbon fiber precursor by melt spinning, which can be thermally cross-linked in air.

SUMMARY OF THE INVENTION

An embodiment of the invention is directed to a method for formation of filaments of polymers of acrylonitrile and a designated co-monomer comprising the steps of: combining an acrylonitrile monomer with a co-monomer to form a composition; adding a plasticizer to the composition; melt-spinning the composition to form fibers of the composition; annealing the fibers; stabilizing the fibers; and carbonizing the fibers.

Another embodiment of the invention is directed to a carbon fiber composition comprising at least 75 wt % of acrylonitrile monomer and up to 25 wt % of a co-monomer wherein the fibers are melt spun, stabilized and carbonized and have a diameter ranging to 5-25 microns.

Another embodiment of the invention is directed to a carbon fiber composition comprising at least 70 wt % of acrylonitrile monomer and up to 30 wt % of a co-monomer wherein the fibers are melt spun, stabilized and carbonized and have a diameter ranging to 5-25 microns.

BRIEF DESCRIPTIONS OF THE DRAWINGS

DETAILED DESCRIPTION OF EXEMPLARY EMBODIMENTS

Figure 1:
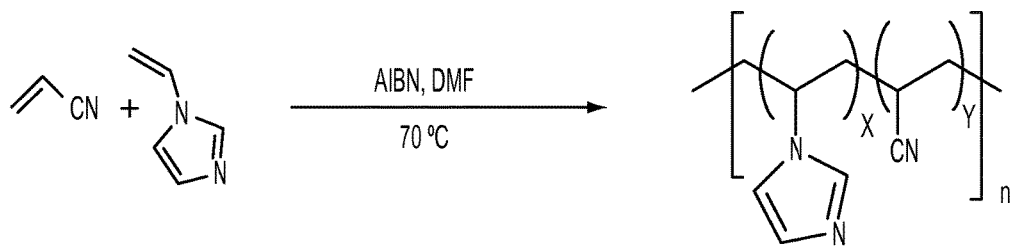
FIG. 1 shows the synthesis of acrylonitrile (AN) and N-vinylimidazole (VIM) to form the copolymer in accordance with an embodiment of the invention.

The invention provides acrylonitrile containing co-polymers that are used to create melt processable carbon fiber precursor compositions. An embodiment of the invention provides a co-polymer comprising PAN and VIM (N-vinylimidazole).

PAN is a vinyl polymer which is prepared from acrylonitrile typically via free radical vinyl polymerization. Other polymerization conditions can be used to prepare isotactic, syndiotactic, or a combination of all three configurations. In general, PAN is used to make materials such as carbon fiber.

The co-monomers in the acrylonitrile copolymer can be present in any suitable ratio in the copolymer. For example, if two monomers, A and B, are used, the resulting copolymer can have a range of weight ratios of A:B, such that the total of the monomers adds up to 100%. In certain embodiments of the invention, the amount of each monomer in a copolymer varies from 1 wt % to 99 wt %. More preferably, the amounts of each monomer may be present in the copolymer within a range 10 wt % to 90 wt %, 20 wt % to 80 wt %, 30 wt % to 70 wt %, 40 wt % to 60 wt % or 50 wt % to 50 wt %.

In certain embodiments of the invention, the polymers of the claimed invention comprise a monomer containing a >C=C< group. In certain embodiments of the invention, the monomer containing a >C=C< group is selected from 1-vinyl imidazole, 4-vinyl imidazole, 2-vinyl imidazole, and 1-methyl-2-vinyl imidazole.

In an embodiment of the invention, the ratio of acrylonitrile to VIM ranges from 80 wt % AN and 20 wt % VIM to 70 wt % AN and 30 wt % VIM. In certain preferred embodiments, the acrylonitrile copolymer comprises 75 wt % and 25 wt % AN/VIM, 74 wt % and 26 wt % AN/VIM, 73 wt % and 27 wt % AN/VIM or 72 wt % and 28 wt % AN/VIM.

In an embodiment of the invention, the ratio of acrylonitrile to VIM ranges from 80 mol % AN and 20 mol % VIM to 85 mol % AN and 15 mol % VIM. In certain preferred embodiments, the acrylonitrile copolymer comprises 87 mol % and 13 mol % AN/VIM (87/13), 84 mol % and 16 mol % AN/VIM (84/16), 81 mol % and 19 mol % AN/VIM (81/19) or 82 mol % and 18 mol % AN/VIM (82/18).

In an embodiment of the invention, a co-polymer of AN and VIM is formed by introducing VIM into PAN using a polymerization process. VIM co-monomer is introduced to enhance the α-hydrogen acidity of PAN and decrease crystallinity of PAN allowing melt-processability.

In embodiments of the invention, the polymers of the claimed invention are used to create fibers using a spinning process. A melt-spinning process is advantageous over conventional solution spinning because it eliminates the use of toxic solvent. Furthermore, the recovery of melt-spun fibers also makes melt-spinning a more cost effective method. This process also uses a more concentrated precursor which creates fibers that are essentially void-free. In certain embodiments, the temperatures of melt extrusion will be from 100° C. to 200° C. in inert atmosphere. The resulting filaments are drawn 3-4 times thereby reducing filament diameter. The drawn fibers can be heated or annealed by applying a tension to temperatures from 100° C. up to 150° C. causing a fiber diameter reduction.

In certain embodiments of the invention, the polymers of the claimed invention are combined with a crosslinking compound prior to being spun into fibers. In an embodiment of the invention, the crosslinking compound is azobisisobutyronitrile (AIBN). The AIBN compound is used to crosslink the polymer and modify the physical properties of the spun fibers. For example, fibers spun with AIBN are less sticky.

In certain embodiments of the invention, chain transfer agent is introduced into the polymerization reaction. The chain transfer agent used in certain embodiments of the invention is 1-dodecanethiol (DDT).

An embodiment of the invention is directed to a method for formation of filaments of polymers of acrylonitrile and a designated copolymer wherein the composition comprises around 30 wt % of copolymer and an acrylonitrile concentration of at least 70 wt %.

In certain embodiments of the invention, a disruptive plasticizer is added to the copolymer composition. In certain embodiments, the plasticizer comprises a mixture of oligomers of varying molecular weights ranging from 500 to 2000 daltons. In some embodiments, the plasticizer comprises an oligomer of acrylonitrile-co-methyl-1-imidazoleacrylate. In certain embodiments, the concentration of the disruptive plasticizer ranges to 5-10 wt % of the copolymer composition.

In certain embodiments, the plasticizer comprises an oligomer of acrylonitrile-co-N-imidazole acrylate having a molecular weight ranging from 1,000-2,000 daltons. In certain embodiments, the oligomer of acrylonitrile-co-N-imidazole acrylate has the structure set forth below:

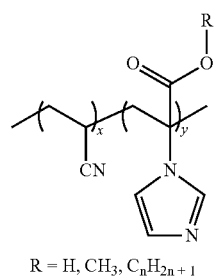

$R = H, CH_3, C_nH_{2n+1}$

In certain embodiments of the invention, the annealed fibers or filaments are subjected to a stabilization step. Stabilization occurs through either the oxidative or pure cyclization routes. Both routes form a ladder polymer where the cyano functional groups will go through an interchain rearrangement. The annealed fiber is stabilized while applying tension at step-wise temperature control. In certain embodiments of the invention, the fibers are heated to 300° C. at a step of 1° C. per minute. In other embodiments of the invention, the fibers are heated at 150° C. for 30 minutes followed by heating 300° C. at a step of 1° C. per minute. In alternate embodiments of the invention, the fibers are heated 100° C. for 90 minutes to allow for settling and initial oxidation of the polymer. Following the initial heating step, the fibers are heated up to 300° C. for 30 minutes before cooling back down to room temperature.

In embodiments of the invention, the diameter of the stabilized fiber is in the range of 10-25 microns.

Stabilized fibers are carbonized by heating the stabilized fibers to temperatures of up to 900° C. and 1400° C. In certain embodiments, an added isothermal step to the carbonization step allows for slower denitrogenation, which results in less pores and stronger fibers. The diameter of the carbonized fiber is in the range of 5-10 microns and preferably 4-6 microns In an embodiment of the invention, the process involves the synthesis of base copolymer of acrylonitrile (AN) and N-vinylimidazole (VIM; 1-vinylimidazole) at an 82:18 molar ratio respectively in solution. The synthesis is a radical polymerization with 2,2-azobis(2-methylpropionitrile) (AIBN) as the initiator and 1-dodecanethiol as the chain transfer agent. This synthesis at this ratio has been determined the best possible ratio for creating a melt processable fiber while retaining high strength and high carbon yield for a carbon fiber end product. The raw material is processed via melt spinning at temperatures between 170° C. and 190° C. to form small diameter filaments. The processing temperatures can be lowered while retaining high desirable properties by utilizing specific plasticizers for this environment. High char yields of 50% and higher can be obtained for carbon fiber production and high strengths can be achieved depending upon post-extrusion processing.

Generally higher molecular weight polymers produce higher strength fiber. However, extremely high molecular weight polymers adversely affects the ability of melt-processing because high molecular weight polymer yields higher melt viscosity. When the viscosity is too high, the resulting compositions can be difficult to extrude. By controlling the reaction conditions, a wide range (Mw: 18 KDa-145 KDa, PDI=1.2-2.0) of copolymers were synthesized. In embodiments of the claimed invention, the molecular weight of the copolymers ranged from 40 KDa-110 KDa with a polydispersity index (PDI) of 1.3-1.8. In certain embodiments of the invention, the molecular weight of the copolymers ranged from 70 KDa-110 KDa with a PDI of 1.3-1.4. In certain preferred embodiments of the invention, the molecular weight of the copolymers ranged from 80 KDa-90 KDa with a PDI of 1.3-1.4.

Synthesis of AN-Based Copolymers

The solution polymerization of AN and VIM and other monomers was carried out in a 250 mL flask fitted with a thermocouple probe, condenser, addition funnel and nitrogen inlet. The flask was charged with DMF and purged with nitrogen for 30 minutes. Then the monomers, AIBN and chain transfer agent, 1-dodecanethiol were added drop wise into the flask over a period of 2-5 hours. The polymerization reactions were carried out at 70° C. with continuous stirring. The polymers were precipitated in de-ionized water, filtered and washed with methanol and hexane to remove residual monomers and then dried in vacuum oven for two days till constant weight was obtained. FIG. 1 illustrates a schematic of the solution polymerization of AN and VIM.

Melt Spun Fibers

82/18 AN/VIM copolymer precursor was ground into coarse granules in a grinder and these copolymer granules were vacuum dried at 65° C. for 3 hours. A Malvern Rosand Rheometer was used to draw the fibers. In a typical trial, 9 g of copolymer was loaded in preheated rheometer at 180° C. under nitrogen atmosphere and left there to heat up for 10 minutes, after that drawing temperature was raised to 192° C.

Stabilization

Figure 2:
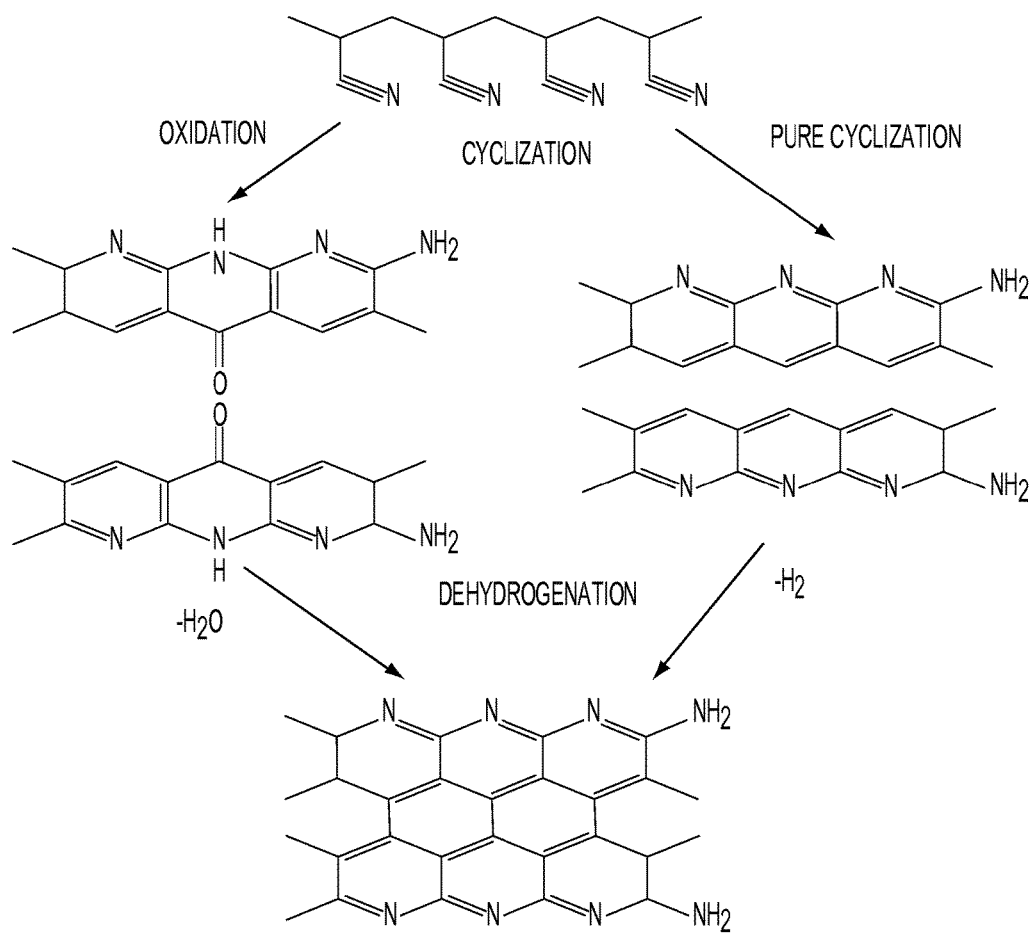
FIG. 2 shows the paths of polyacrylonitrile-N-vinylimidazole (AN/VIM) copolymer through stabilization (cyclization) to the final carbonized network in accordance with an embodiment of the invention.

Stabilization is the step of cyclization of the acrylonitrile groups, as can be seen in FIG. 2.

Figure 3:
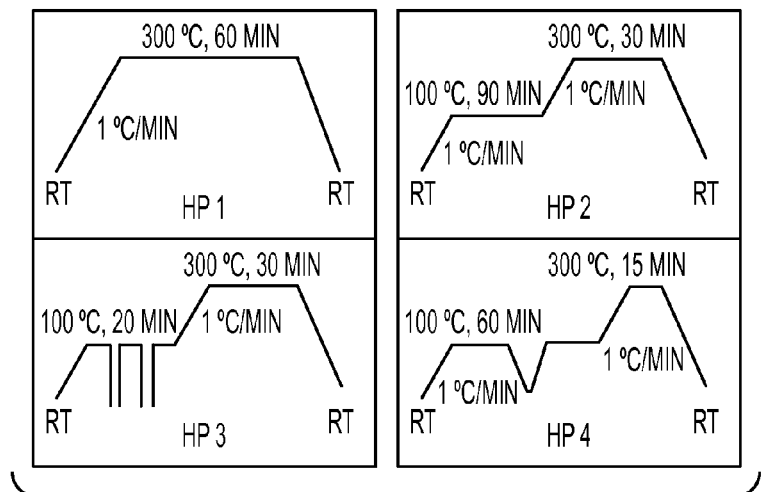
FIG. 3 shows the stabilization programs describing the temperature profiles of stabilized fibers in accordance with an embodiment of the invention.
Figure 4:
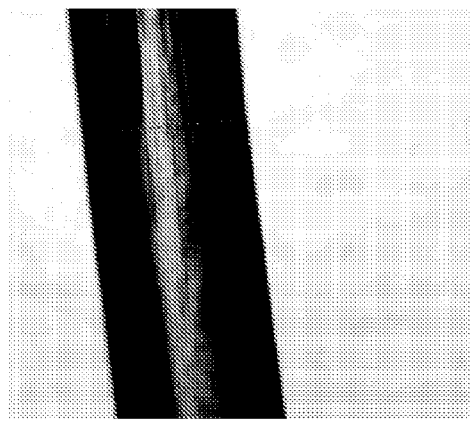
FIG. 4 shows an optical microscope photograph of a stabilized AN/VIM copolymer fiber in accordance with an embodiment of the invention.

The heating programs of the stabilization step are shown in FIG. 3, where the first heating program, HP1, goes directly to 300° C. at a step of 1° C. per minute, while HP2 has an original step at 150° C. for 30 minutes then to 300° C. at a step of 1° C. per minute. The program, HP2, was altered to a first step at 100° C. for an hour and half, instead of the original 30 minutes only, to allow for settling and initial oxidation of the polymer. Then the fiber is stepped up to 300° C. for 30 minutes only before cooling back down to room temperature. It has been found from experimentation and from the results, that the heating program HP2 is the best for forming stabilized fibers. All fibers stabilized were performed with added tension of a weight at the end of the fiber during heating. FIG. 4 shows an optical microscope photograph of a stabilized AN/VIM copolymer fiber.

Carbonization

Figure 5:
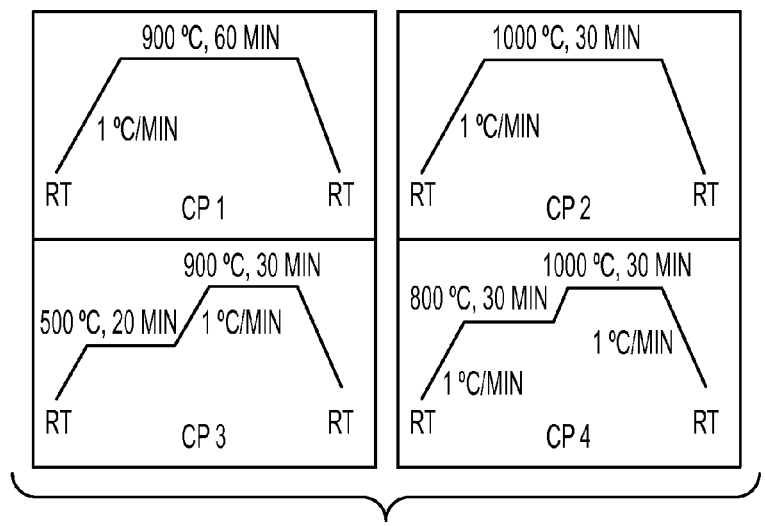
FIG. 5 shows the carbonization programs describing the temperature profiles for carbonized fibers in accordance with an embodiment of the invention.

The heating programs of the carbonization step are shown in FIG. 5. Carbonization is the last step in the formation of carbon fiber, where the stabilized fiber is subjected to further heating. Traditional programs for solution based acrylonitrile carbon fibers are shown as CP1 and CP2, where the temperature is ramped up to 900° C. and 1000° C. respectively. It has been seen through experimentation that the best results for carbonized fibers are the routes of CP3 and CP4 where an added isothermal step will allow for slower denitrogenation where there will be less pores and stronger fibers.

Figure 6:
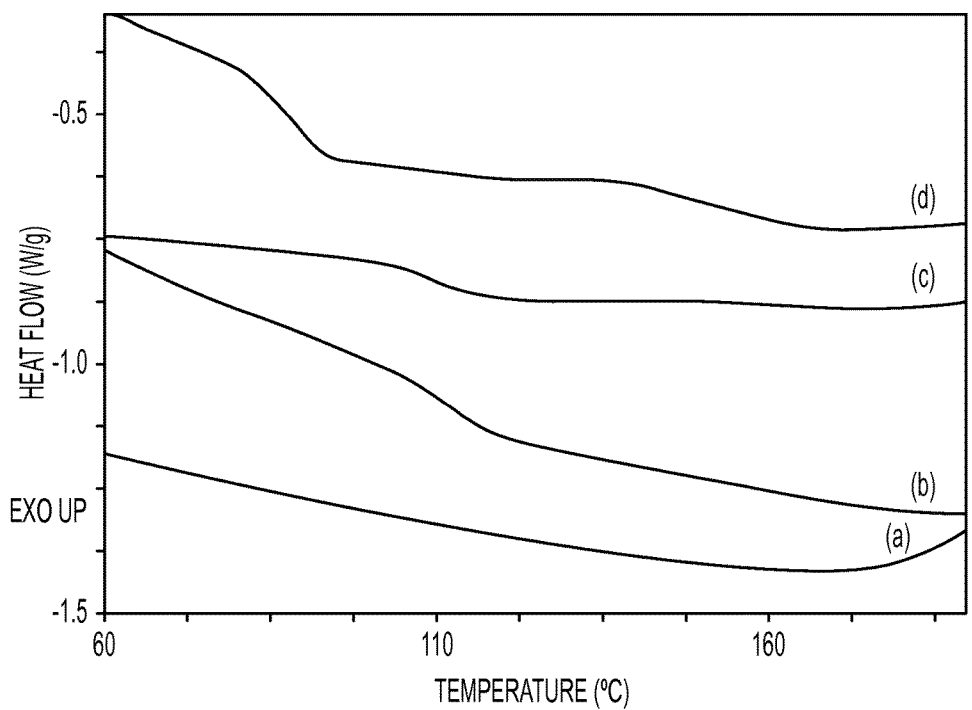
FIG. 6 shows DSC Thermograms of (a) AN homopolymer; (b) 87/13 AN/VIM; (c) 84/16 AN/VIM; and (d) 81/19 AN/VIM copolymers.

FIG. 6 shows the differential scanning calorimetry (DSC) thermograms of the differences in the ratios of the copolymer to get the different glass transition temperatures necessary to create a melt processable fiber in comparison to homopolymer.

Figure 7:
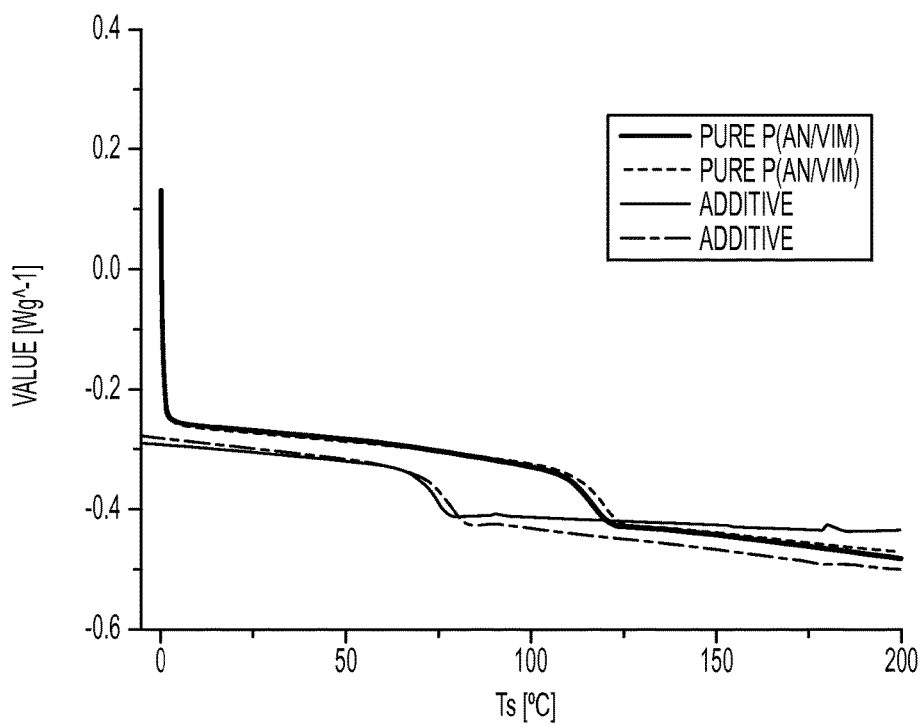
FIG. 7 shows DSC thermograms of 82:18 AN/VIM and 82:18 AN/VIM with and without added plasticizer.

FIG. 7 shows the evaluation of base 82:18 AN/VIM copolymer with multiple additives such as plasticizers and flow aids. Plasticizers have been well known in melt processing to lower processing temperatures and to increase material productivity. A plasticizer such as poly(acrylonitrile-co-methyl-1-imidzaoleacrylate) reduces the glass transition temperatures and also decreases the potential processing temperature of the raw material. A preferred plasticizer is a solid at room temperature since the solid compound can be blended with the copolymer without generating organic vapor/odor. This plasticizer being relative to the base polymer in structure, allows for incorporation into the final carbon product while not hindering mechanical or char yields of the final material.

Figure 8:
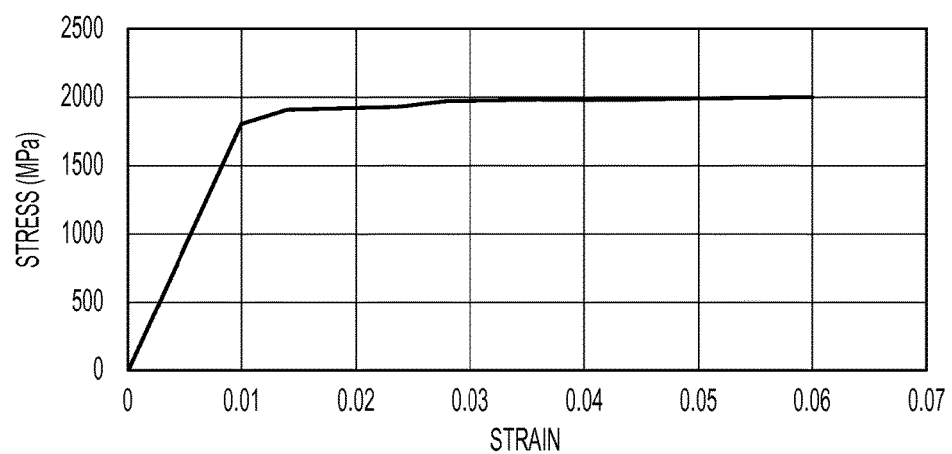
FIG. 8 shows the tensile strength of carbonized 82:18 AN/VIM copolymer.
Figure 9:
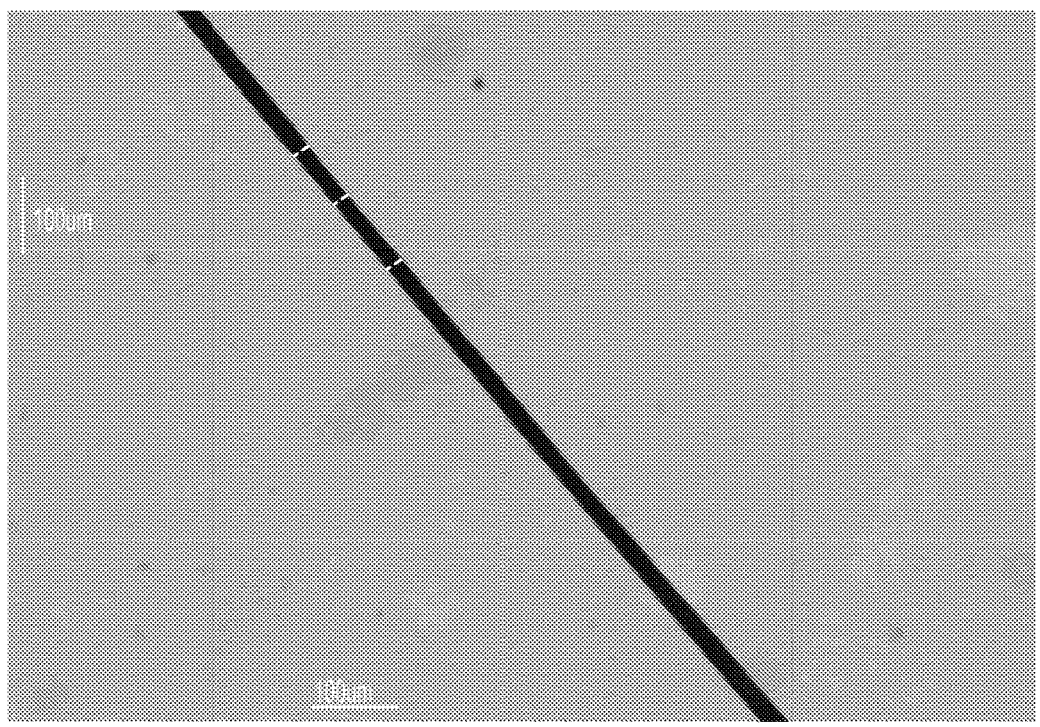
FIG. 9 shows a carbon fiber in accordance with an embodiment of the invention.

An AN/VIM copolymer was synthesized and was extruded by using a single fiber extruder (rheometer), and the extruded fiber was then stabilized at 150 for 30 min followed by heating 300° C. at a step of 1° C. per minute applying tension followed by a carbonization to produce carbon fiber. The carbonization condition used was to heat the stabilized fiber in an oven under argon atmosphere to reach the temperature at 500° C. and hold at the temperature for 20 min and then heated up to 900° C.-1000° C. end temperature. FIG. 8 shows the carbon fiber image having a diameter from 15 μm to 20 μm. FIG. 9 shows the results of a rheometer test done with the carbon fiber. The fiber yielded a tensile strength of approximately 2 GPa (2,000 MPa) and a Young's Modulus of approximately 180 GPa.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments will become apparent to those of ordinary skill in the art upon reading the foregoing description. Accordingly, this invention includes all modifications and equivalents of the subject matter recited in the claims appended hereto.

What is claimed is:

1. A method for formation of filaments of co-polymers comprising acrylonitrile and a vinyl imidazole co-monomer comprising the steps of:

combining acrylonitrile with the vinyl imidazole co-monomer to form a co-polymer composition;
adding a plasticizer to the composition;
melt-spinning the composition to form fibers of the composition in the absence of a solvent;
annealing the fibers;
stabilizing the fibers; and
carbonizing the fibers;
wherein the composition has a glass transition temperature between 100° C. and 150° C., and has a molecular weight ranging from 18 KDa to 145 KDa and a polydispersity index (PDI) of 1.2 to 2.0.

2. The method of claim 1, wherein acrylonitrile is at least 70 wt % of the composition and the co-monomer is up to 30 wt % of the composition.

3. The method of claim 1, wherein the co-monomer is selected from 1-vinyl imidazole, 4-vinyl imidazole, 2-vinyl imidazole, and 1-methyl-2-vinyl imidazole.

4. The method of claim 1, wherein the plasticizer is an oligomer of acrylonitrile-co-methyl-1-imidazoleacrylate.

5. The method of claim 1, wherein the melt spinning is carried out at 100° C. to 200° C. in an inert atmosphere.

6. The method of claim 1, wherein the annealing is carried out at 100° C. to 150° C. under tension.

7. The method of claim 2, wherein the ratio of acrylonitrile to co-monomer ranges from 80 wt %:20 wt % to 70 wt %:30 wt %.

8. The method of claim 1, wherein the plasticizer is from 5 wt % to 10 wt % of the composition.

9. The method of claim 1, wherein the plasticizer is an oligomer of acrylonitrile-co-N-imidazole acrylate having a molecular weight ranging from 1,000-2,000 daltons.

10. The method of claim 5, wherein the diameter of the fibers is reduced by repeated drawing during melt spinning.

11. The method of claim 1, wherein stabilizing is carried out by heating fibers to 300° C. at a step of 1° C. per minute.

12. The method of claim 1, wherein carbonizing is carried out by heating the stabilized fibers to temperatures of up to 900° C. and 1400° C.

13. A carbon fiber composition formed by the method of claim 1.

14. The carbon fiber composition of claim 13, wherein the composition comprises a copolymer of acrylonitrile and a co-monomer that is selected from the group consisting of 1-vinyl imidazole, 4-vinyl imidazole, 2-vinyl imidazole, or 1-methyl-2-vinyl imidazole.

* * * * *